(12) United States Patent
Sugai

(10) Patent No.: US 7,706,012 B2
(45) Date of Patent: Apr. 27, 2010

(54) DATA PROCESSING APPARATUS, DATA PROCESSING METHOD, AND PROGRAM

(75) Inventor: Yousuke Sugai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 11/385,218

(22) Filed: Mar. 21, 2006

(65) Prior Publication Data

US 2006/0290965 A1 Dec. 28, 2006

(30) Foreign Application Priority Data

Jun. 27, 2005 (JP) .............................. 2005-186588

(51) Int. Cl.
*G06K 15/00* (2006.01)
*G06F 3/12* (2006.01)

(52) U.S. Cl. .................... 358/1.16; 358/1.13; 358/1.14; 358/1.15

(58) Field of Classification Search ................ 358/1.13, 358/1.14, 1.15, 1.16; 717/174
See application file for complete search history.

(56) References Cited

U.S. PATENT DOCUMENTS 5,933,646 A * 8/1999 Hendrickson et al. ........ 717/169

FOREIGN PATENT DOCUMENTS

JP 10-260873 9/1998
JP 2001256007 A * 9/2001

* cited by examiner

*Primary Examiner*—Benny Q Tieu
*Assistant Examiner*—Sunil Chacko
(74) *Attorney, Agent, or Firm*—Canon U.S.A. Inc., I.P. Division

(57) ABSTRACT

A data processing apparatus includes a storage unit that stores print history data, and a display unit that displays a screen for introducing recommended software based on the print history data.

15 Claims, 16 Drawing Sheets

| APPLICATION NAME | STORAGE LOCATION OF UNINSTALLER | DESCRIPTION PRESENTATION FLAG | UNINSTALLATION FLAG | INTRODUCTION MESSAGE | RECOMMENDED DATA TYPE |
|---|---|---|---|---|---|
| SIMPLE PICTURE PRINTING | C:\prog\a\uninst.exe. | 1 | 0 | ... | PICTURE |
| SIMPLE CD PRINTING | C:\prog\a\uninst.exe. | 1 | 0 | ... | CD-R |
| SIMPLE WEB PRINTING | C:\prog\a\uninst.exe. | 0 | 0 | ... | WEB |

FIG. 12

| DATA TYPE | FREQUENCY | APPLICATION | FREQUENCY |
|---|---|---|---|
| PICTURE | 50 | SIMPLE PICTURE PRINTING | 0 |
| | | APPLICATION OTHER THAN RECOMMENDED APPLICATION | 50 |
| WEB | 20 | SIMPLE WEB PRINTING | 15 |
| | | APPLICATION OTHER THAN RECOMMENDED APPLICATION | 5 |
| ... | ... | | |
| ... | ... | | |
| ... | ... | | |

FIG. 13

| EXTENSION | PAPERSIZE | MEDIATYPE | DATA TYPE |
|---|---|---|---|
| HTML | — | — | WEB |
| HTML | — | — | WEB |
| jpg | A4 | GLOSSY PAPER | PICTURE |
| | | PLAIN PAPER | — |
| | POSTCARD | — | POSTCARD |
| | CD-R | | CD-R |
| — | A4 | — | — |
| | POSTCARD | — | POSTCARD |
| | CD-R | | CD-R |
| ... | | | |
| ... | | | |
| ... | | | |

FIG. 16

| APPLICATION NAME | STORAGE LOCATION OF UNINSTALLER | DESCRIPTION PRESENTATION FLAG | UNINSTALLATION FLAG | INTRODUCTION MESSAGE | RECOMMENDED DATA TYPE | PRIORITY |
|---|---|---|---|---|---|---|
| SIMPLE PICTURE PRINTING | C:\prog\a\uninst.exe | 1 | 0 | ... | PICTURE | 5 |
| SIMPLE ALBUM PRINTING | C:\prog\a\uninst.exe | 1 | 0 | ... | PICTURE | 4 |
| SIMPLE CD PRINTING | C:\prog\a\uninst.exe | 0 | 0 | ... | CD-R | 5 |
| SIMPLE WEB PRINTING | C:\prog\a\uninst.exe | 1 | 0 | ... | WEB | 5 |

DATA PROCESSING APPARATUS, DATA PROCESSING METHOD, AND PROGRAM

BACKGROUND OF THE INVENTION

1. Field of the Invention

The present invention relates to data processing apparatuses, data processing methods, and programs that perform print processing.

2. Description of the Related Art

Currently available software related to printers includes printer drivers that enable control of printers in computer systems and application software to enable users to perform various types of printing. Herein, application software that is dedicated to the purpose of performing a specific type of printing and provides the users with a convenient printing method is referred to as printing-dedicated application software (hereinafter referred to as a printing application).

In general, users use integrated installers that install a plurality of printing applications with the aforementioned printer drivers at the same time in order to make printers available to their computer systems.

However, a problem with the integrated installers has been that many users neglect and do not access some installed applications because a large number of applications are installed without the users knowing of the functions of the applications. Thus, for example, a method has been developed, in which applications that are currently being installed are introduced to users by playing an animation at the time of installation so that the users recognize the applications.

Moreover, another problem has been that applications that are not necessary for users are installed when applications are installed with an integrated installer at the same time, resulting in the unnecessary applications wastefully occupying a storage area of a computer system.

Thus, a method has been developed, in which a predetermined test period is set, and applications to be actually installed are determined at the time of actual installation in a manner that depends on how often the user uses corresponding applications in the predetermined test period.

Moreover, in an invention disclosed in Japanese Patent Laid-Open No. 10-260873, the usage histories of individual applications are stored, and applications that have not been used often are deleted when an available storage space of a computer system comes small.

SUMMARY OF THE INVENTION

The present invention is provided to solve at least one of the aforementioned problems. According to the present invention, a user can use appropriate print processing software or image processing software.

Moreover, according to the present invention, print processing software or image processing software that is suitable for the user can be presented to the user based on print histories so that the user utilizes convenient print processing software or image processing software.

Moreover, according to the present invention, the efficiency of the use of a memory can be improved by deleting unnecessary software, and an environment can be provided to the user in which the user can use appropriate software.

According to an aspect of the present invention, a data processing apparatus includes a storage unit configured to store print history data, and a display unit configured to display a screen for introducing recommended software based on the print history data.

According to another aspect of the present invention, a data processing method includes reading print history data, and displaying a screen for introducing recommended software based on the print history data.

Further features of the present invention will become apparent from the following description of exemplary embodiments with reference to the attached drawings.

BRIEF DESCRIPTION OF THE DRAWINGS

FIG. 12 shows print histories of individual data types according to the first exemplary embodiment of the present invention.

FIG. 13 shows a print-profile conversion table according to the first exemplary embodiment of the present invention.

FIG. 16 shows the content of an exemplary application information DB according to the second exemplary embodiment of the present invention.

DESCRIPTION OF THE EMBODIMENTS

First Exemplary Embodiment

A first exemplary embodiment according to the present invention will now be described. In the first exemplary embodiment, a printer driver performs a print job and then introduces an application to a user.

Figure 1:
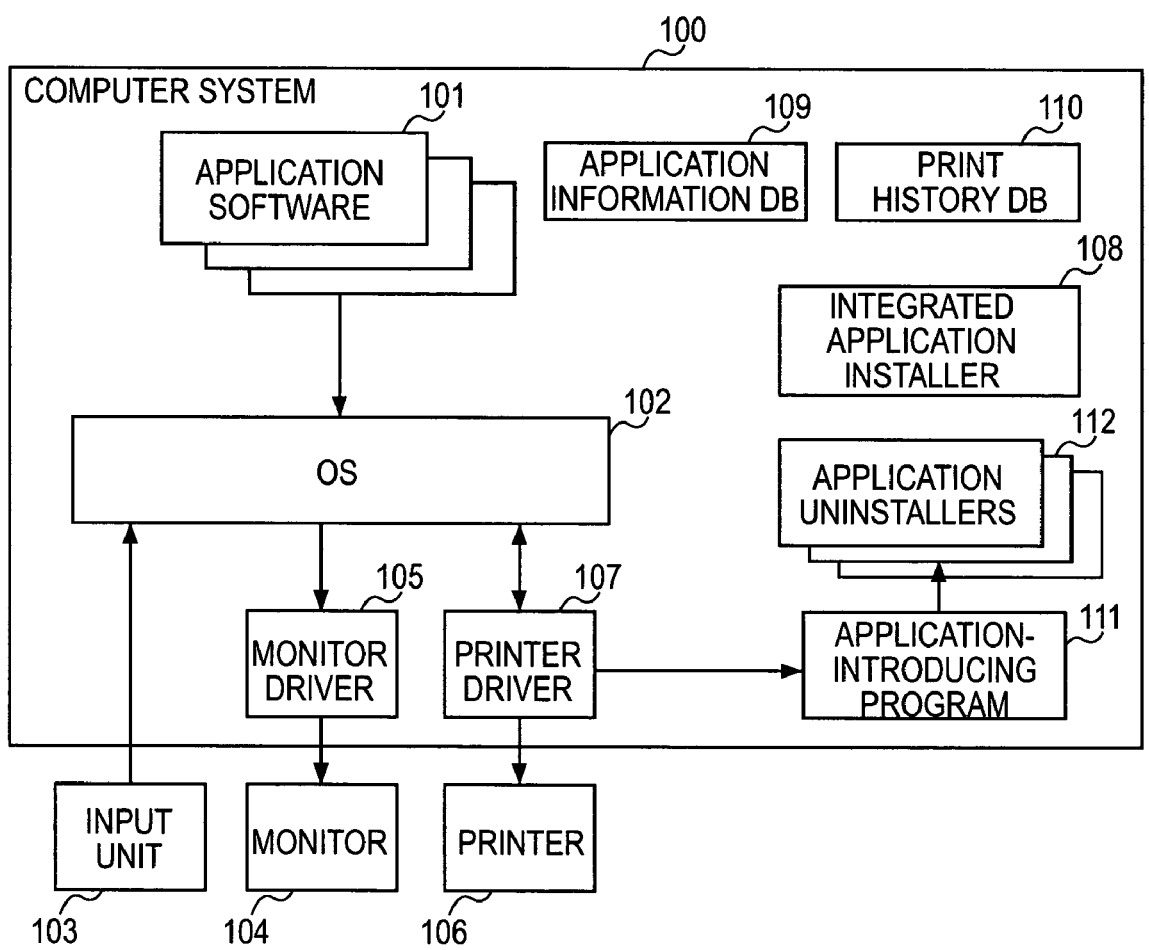
FIG. 1 is a block diagram showing the configuration of modules according to a first exemplary embodiment of the present invention.

FIG. 1 shows the configuration of modules according to the first exemplary embodiment.

A computer system 100 on which a printing system according to the first exemplary embodiment operates includes application software 101, an operating system (OS) 102, a monitor driver 105, a printer driver 107, an integrated application installer 108, an application information database (DB) 109, a print history DB 110, an application-introducing program 111, and application uninstallers 112. An input unit 103, a monitor 104, and a printer 106 are connected to the computer system 100.

The OS 102 controls the application software 101, the drivers, the peripherals, and the like in the computer system 100. The application software 101 has a function of creating print data, a function of invoking a print setting screen for setting the paper size at the time of printing and the like via the printer driver 107, and a function of sending the print data to the OS 102 after print setting. The input unit 103 is a unit to be operated by the user, and the input from the user is sent to the software in the computer system 100 via the OS 102. The monitor driver 105 receives an instruction for drawing images that is issued to the OS 102 and performs processing of displaying the images on the monitor 104. The monitor 104 receives an instruction from the monitor driver 105 and displays data on a screen.

The integrated application installer 108 has a function of installing a plurality of the application software 101 and the application uninstallers 112 in the computer system 100 and a function of registering information of the installed applications and the uninstallers corresponding to the installed applications in the application information DB 109. The application information DB 109 is used to control the data of the printing applications installed in the OS 102. The details of the application information DB 109 will be described below with reference to FIG. 11.

As shown in FIG. 12, the print history DB 110 is used to store the histories of print jobs that have been output in the computer system 100.

The printer driver 107 performs a print job upon being invoked by the OS 102 and issues a print instruction to the printer 106. The printer driver 107 has a function of storing the data associated with printing in the print history DB 110 at the time of printing and a function of invoking the application-introducing program 111 using the data in the print history DB 110 and the application information DB 109. The application-introducing program 111 has a function of sending the OS 102 an instruction for displaying a dialog for introducing applications on the monitor 104, a function of allowing the user to input an instruction for uninstalling the application software 101 via the input unit 103, a function of invoking the application uninstaller 112 of the corresponding application software 101 upon receiving an uninstallation instruction, and a function of registering data that indicates that uninstallation has been performed in the application information DB 109.

The application uninstallers 112 have a function of uninstalling the application software 101. The printer 106 has a function of printing data on the basis of a print instruction from the printer driver 107.

Figure 18:
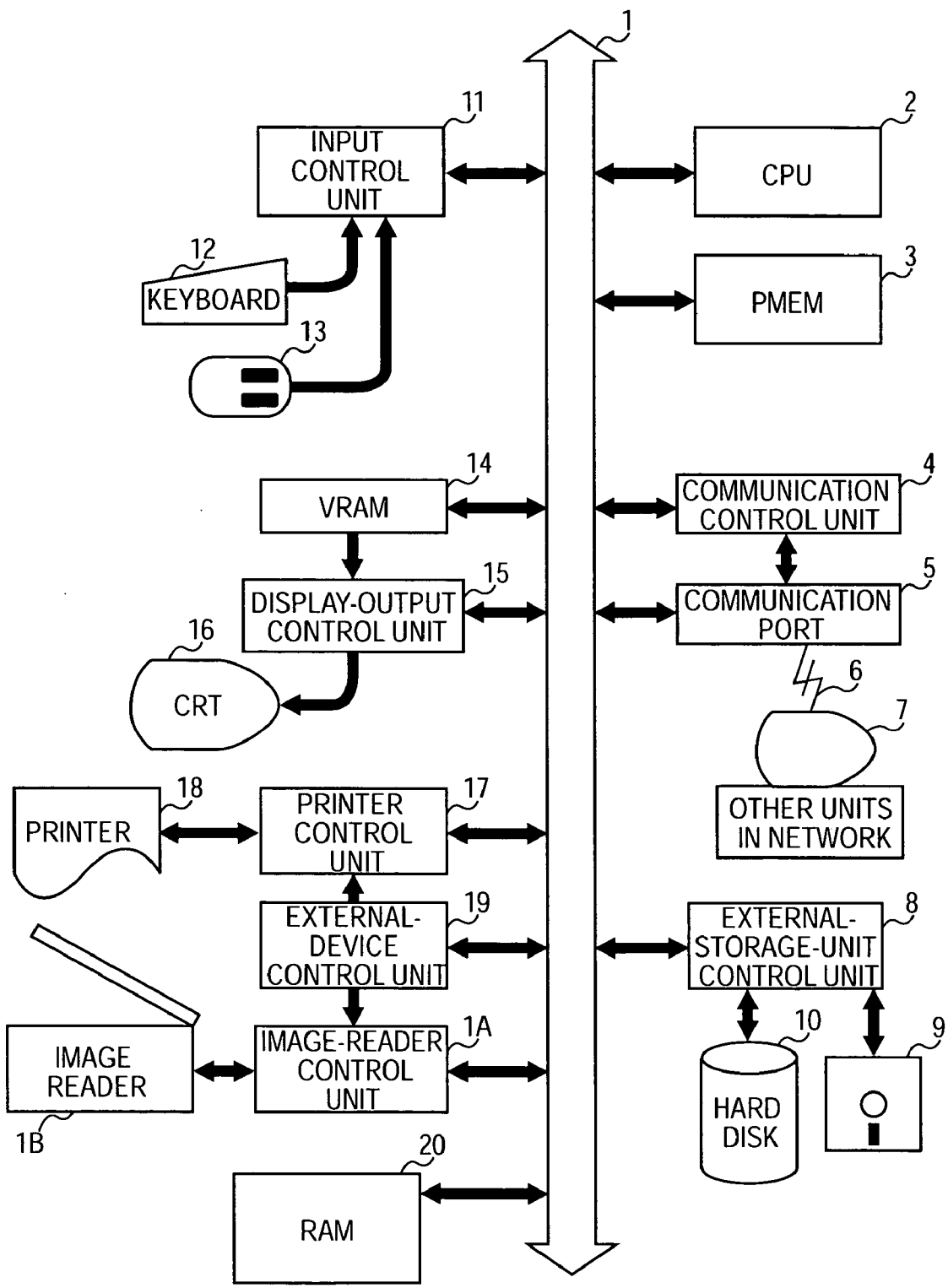
FIG. 18 is a block diagram showing the configuration of exemplary hardware according to the exemplary embodiments of the present invention.

FIG. 18 is a block diagram showing the configuration of a client unit according to the first exemplary embodiment of the present invention. In this configuration, the client unit can communicate with other data-processing units to which predetermined peripherals are locally connected with a predetermined protocol via a communication medium (not shown), for example, a local area network (LAN), such as Ethernet. The predetermined peripherals may include an ink-jet printer, a laser printer, a scanner, a modem, and a multifunction image processing unit.

Individual components described below are connected to a system bus 1. The client unit includes a central processing unit (CPU) 2.

Programs that perform processing according to the first exemplary embodiment are selected and read from a hard disk (HD) 10 to a program memory (PMEM) 3 as necessary and are executed by the CPU 2. Data input via a keyboard 12 and/or pointing device, e.g., a mouse, 13 is stored in the PMEM 3, which also serves as a text memory, as code data.

A communication control unit 4 controls input/output (I/O) data at a communication port 5. Signals output from the communication port 5 are sent to the communication ports of other units 7 in the network via a communication line 6.

Transactions between the client unit and a printer or an image reader (a scanner) shared on the network are performed via the communication control unit 4. Although a network such as a LAN is described in the first exemplary embodiment, the present invention is also applicable even when the communication port 5 connected to the communication control unit 4 and the communication line 6 are those for a public circuit. Images read through the scanner can be sent to the printer to be printed.

An external-storage-unit control unit 8 controls access to disks used for a data file, for example, a removable disk medium 9, such as a floppy disk (referred to as an FD), and the HD 10.

Input units, for example, the keyboard 12 and a pointing device (PD) 13 are connected to an input control unit 11. An operator performs operations including issuing of a system operation instruction by operating the keyboard 12. The PD 13 is used to specify processing of image data displayed on the CRT 16. In this exemplary embodiment, a mouse is used as the PD 13.

The user freely moves a cursor displayed on a cathode-ray tube (CRT) 16 in the X and Y axes directions with the PD 13 to, for example, select a command icon on a command menu to send an order for processing, specify an object to be edited, and specify a drawing position.

Drawing data (bitmap data) to be displayed on the CRT 16 is loaded into a video random access memory (VRAM) 14, and the content of the drawing data is read via a display-output control unit 15 as necessary and displayed on the CRT 16. A printer control unit 17 controls data output to a printer 18 connected to the printer control unit 17.

An image-reader control unit 1A controls an image reading operation of an image reader 1B connected to the image-reader control unit 1A. An external-device control unit 19 controls operations of external devices via the printer control unit 17 or the image-reader control unit 1A.

The client unit can use shared components on the server side via the communication control unit 4 and the communication port 5, as described above.

In the first exemplary embodiment, programs stored in a read-only memory (a ROM) may be alternatively stored in a storage medium, for example, the HD 10 directly connected to the client unit or the removable disk medium 9 or these programs may be stored in another unit connected to the network. The programs according to the present invention can be supplied to systems or units via a storage medium, for example, the HD 10 or the removable disk medium 9, or the network. The various types of programs used in the computer system 100 shown in FIG. 1 are stored in the HD 10. Then, these programs are loaded into a random access memory (RAM) 20 shown in FIG. 18 and executed by the CPU 2, as necessary.

Figure 2:
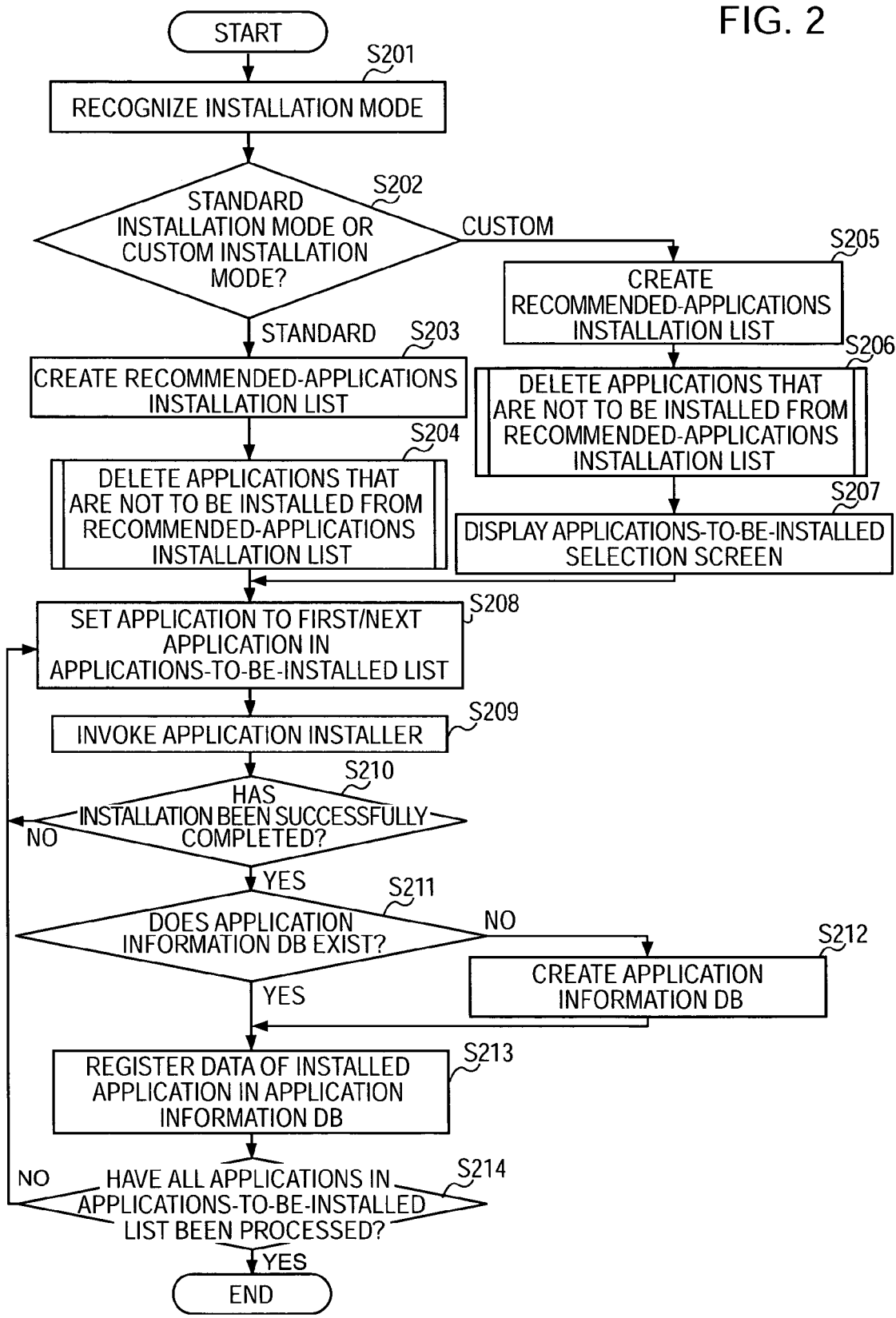
FIG. 2 is a flowchart of a process of an application installer according to the first exemplary embodiment of the present invention.

FIG. 2 is a flowchart of the integrated application installer 108 according to the first exemplary embodiment, which installs applications in the computer system 100. In the process shown in this flowchart, the integrated application installer 108 selects an application to be installed, invokes the corresponding application installer of the application, which is determined to be installed, and registers the data of the application in the application information DB 109 after the installation of the application. The data stored in the application information DB 109 will be described below with reference to FIG. 11.

Figure 3:
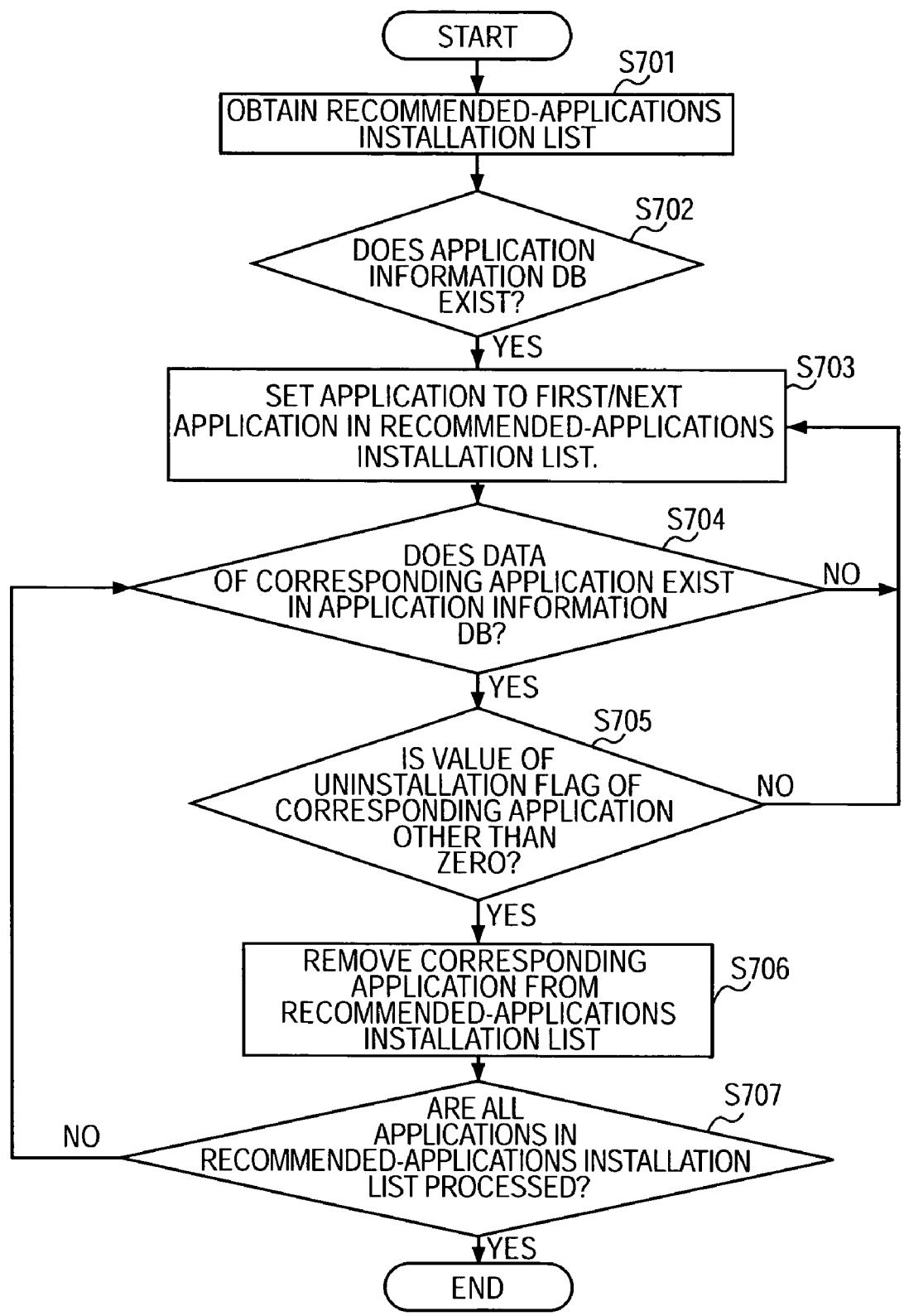
FIG. 3 is a flowchart of a process of determining applications that are not to be installed, the process being invoked by the application installer according to the first exemplary embodiment of the present invention.

FIG. 3 is a flowchart of showing a process of the integrated application installer 108 deleting applications that are not to be installed from a list of the application software 101 that is recommended to be installed. This list is created by the integrated application installer 108. The process is invoked when the integrated application installer 108 creates a list of the application software 101 to be installed. In this illustration, a process flow is shown, in which applications that have previously been uninstalled are searched for based on data in the application information DB 109, and the corresponding applications are deleted from the list of the application software 101 that is recommended to be installed in the computer system 100.

Figure 4:
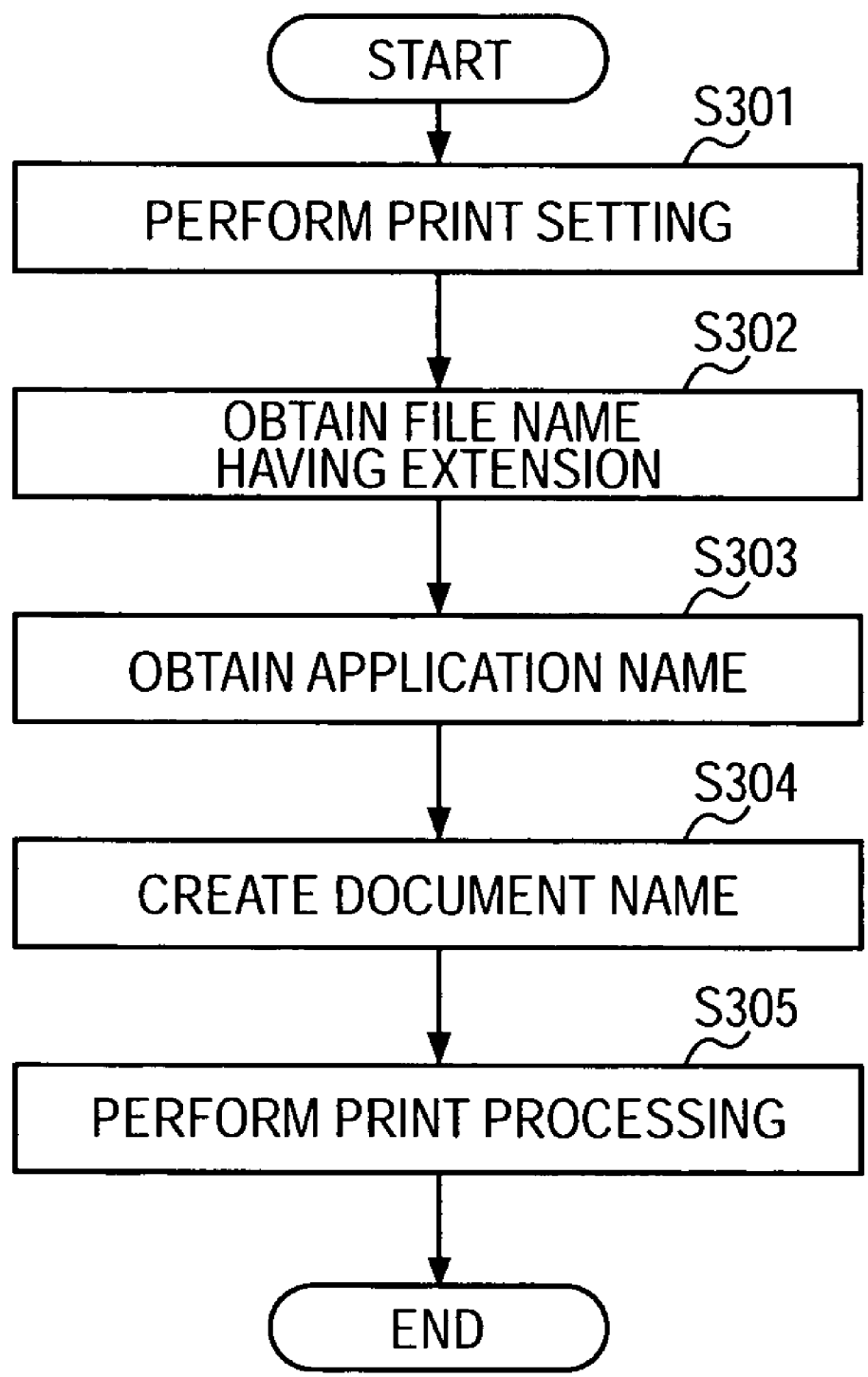
FIG. 4 is a flowchart of print processing in a software application according to the first exemplary embodiment of the present invention.

FIG. 4 is a flowchart of the application software 101 at the time of printing. The application software 101 allows the user to set the print settings, concatenates file names having extensions with application names to create document names, and performs print processing with the document names.

The document names created in this process are used in print processing of the printer driver 107, which will be described below.

Figure 5:
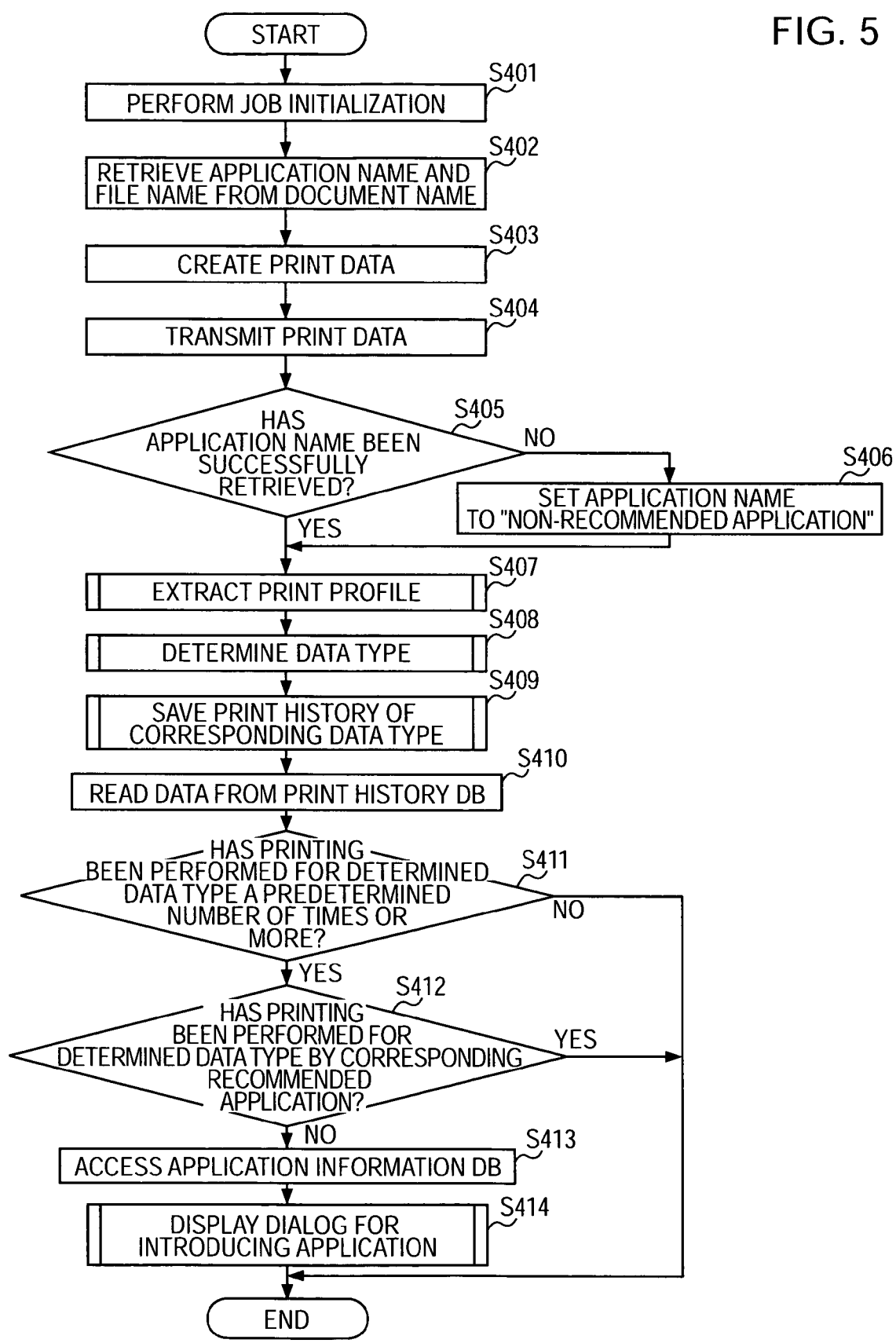
FIG. 5 is a flowchart of print processing in a printer driver according to the first exemplary embodiment of the present invention.

FIG. 5 is the print processing of the printer driver 107. In this illustration, a process flow is described, in which, after the print processing, the print histories of the print processing are recorded, and it is determined whether corresponding applications are to be introduced to the user. When the corresponding applications are to be introduced to the user, the application-introducing program 111 is invoked.

Figure 6:
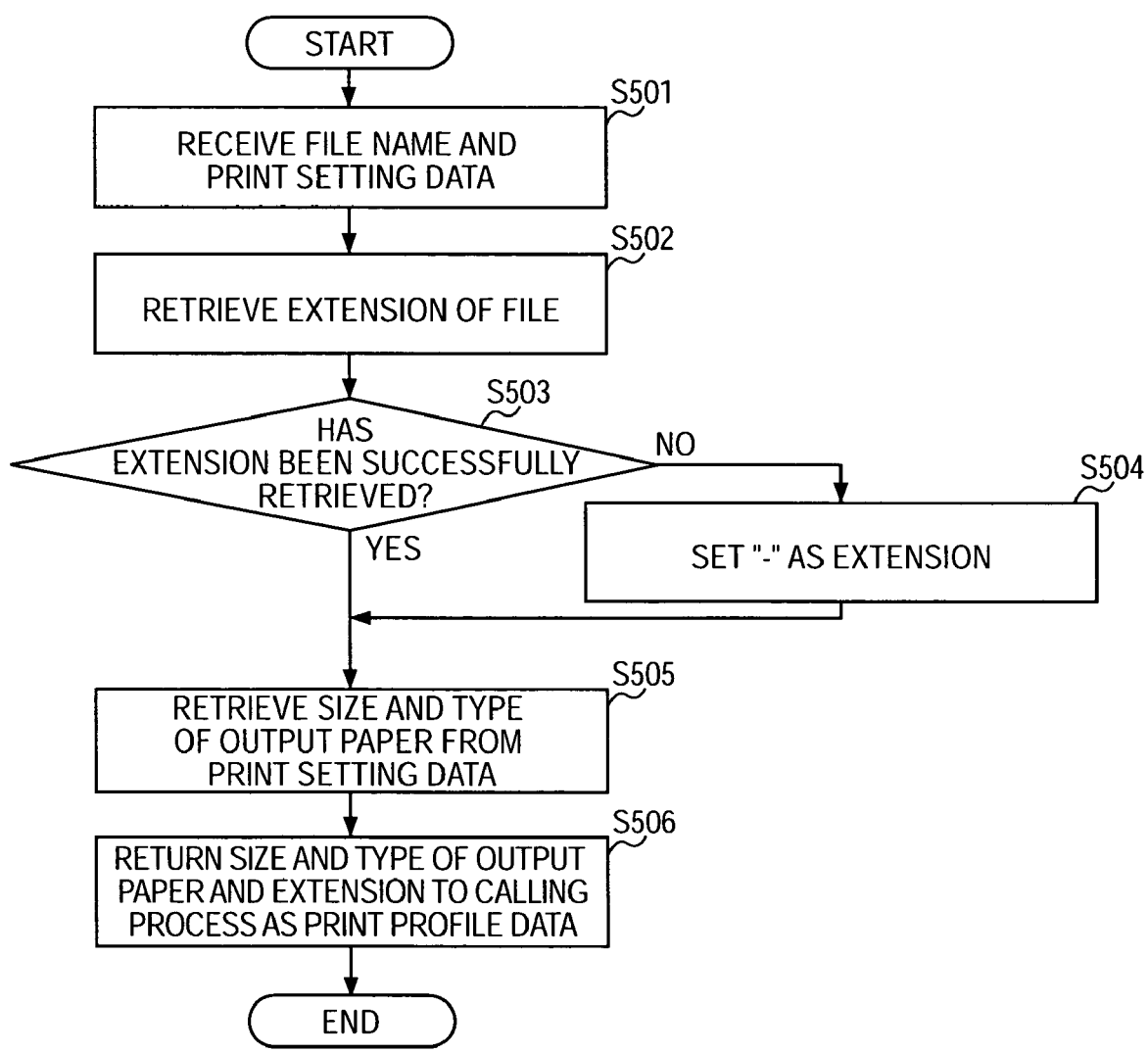
FIG. 6 is a flowchart of a print-profile extracting process that is invoked by the printer driver according to the first exemplary embodiment of the present invention.

FIG. 6 is a flowchart of a print-profile extracting process that is invoked for obtaining print profile data that is used in a process of obtaining data types in the print processing of the printer driver 107. In this illustration, a process is described, in which extensions are obtained from file names, and print paper sizes (for example, A4 or postcard size) and types of print paper (for example, glossy paper or plain paper) are obtained from the print setting data (print paper sizes, types of print paper, image processing settings, and paper feed methods, and the like). Then, the obtained data is supplied to the printer driver 107 as the print profile data.

Figure 7:
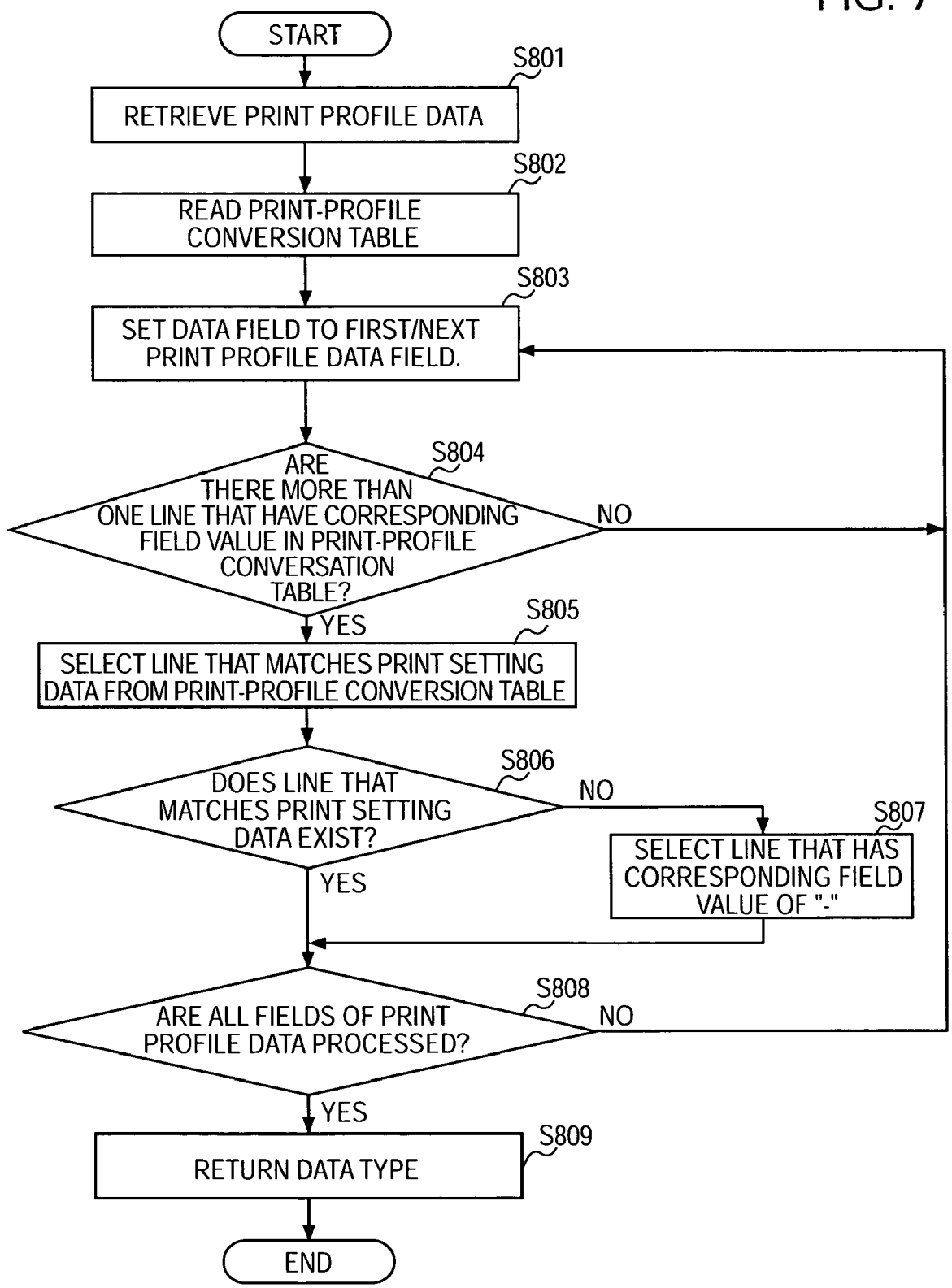
FIG. 7 is a flowchart of a process of determining data types that is invoked by the printer driver according to the first exemplary embodiment of the present invention.

FIG. 7 is a flowchart of a process of determining data types of print data that is invoked in the print processing of the printer driver 107. In this illustration, a process flow is shown, in which data types of print data, for example, photo data or World Wide Web data (Web data), are obtained with reference to a print-profile conversion table on the basis of the print profile data obtained in the aforementioned print-profile extracting process. The print-profile conversion table will be described below with reference to FIG. 13.

Figure 8:
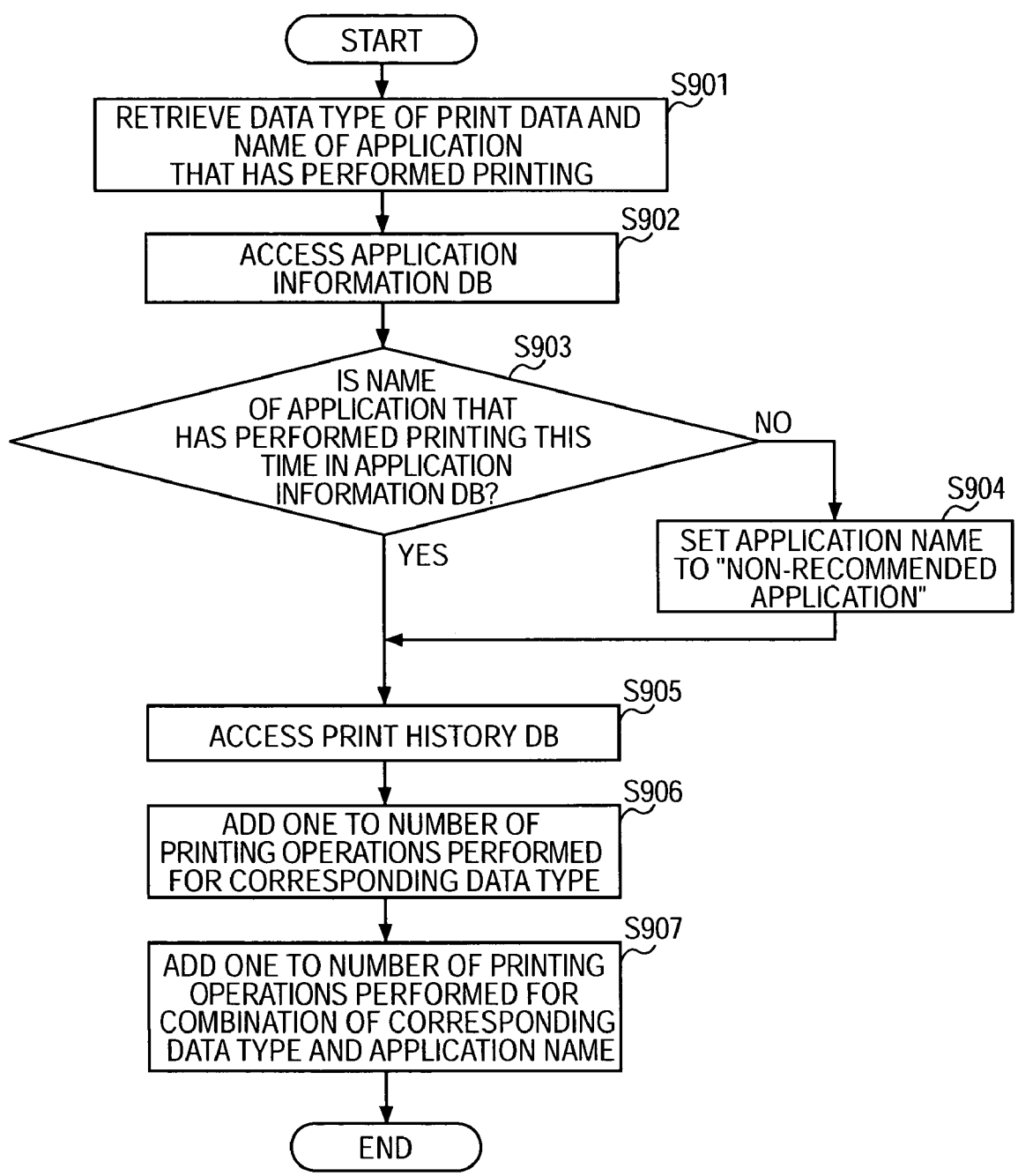
FIG. 8 is a flowchart of a process of storing print histories of individual data types that is invoked by the printer driver according to the first exemplary embodiment of the present invention.

FIG. 8 is a flowchart of a process of storing print histories of individual data types that is invoked after the print processing of the printer driver 107. In this process, print data is stored in the print history DB 110 on the basis of the aforementioned data types of the print data and names of corresponding applications that perform print processing.

Figure 9:
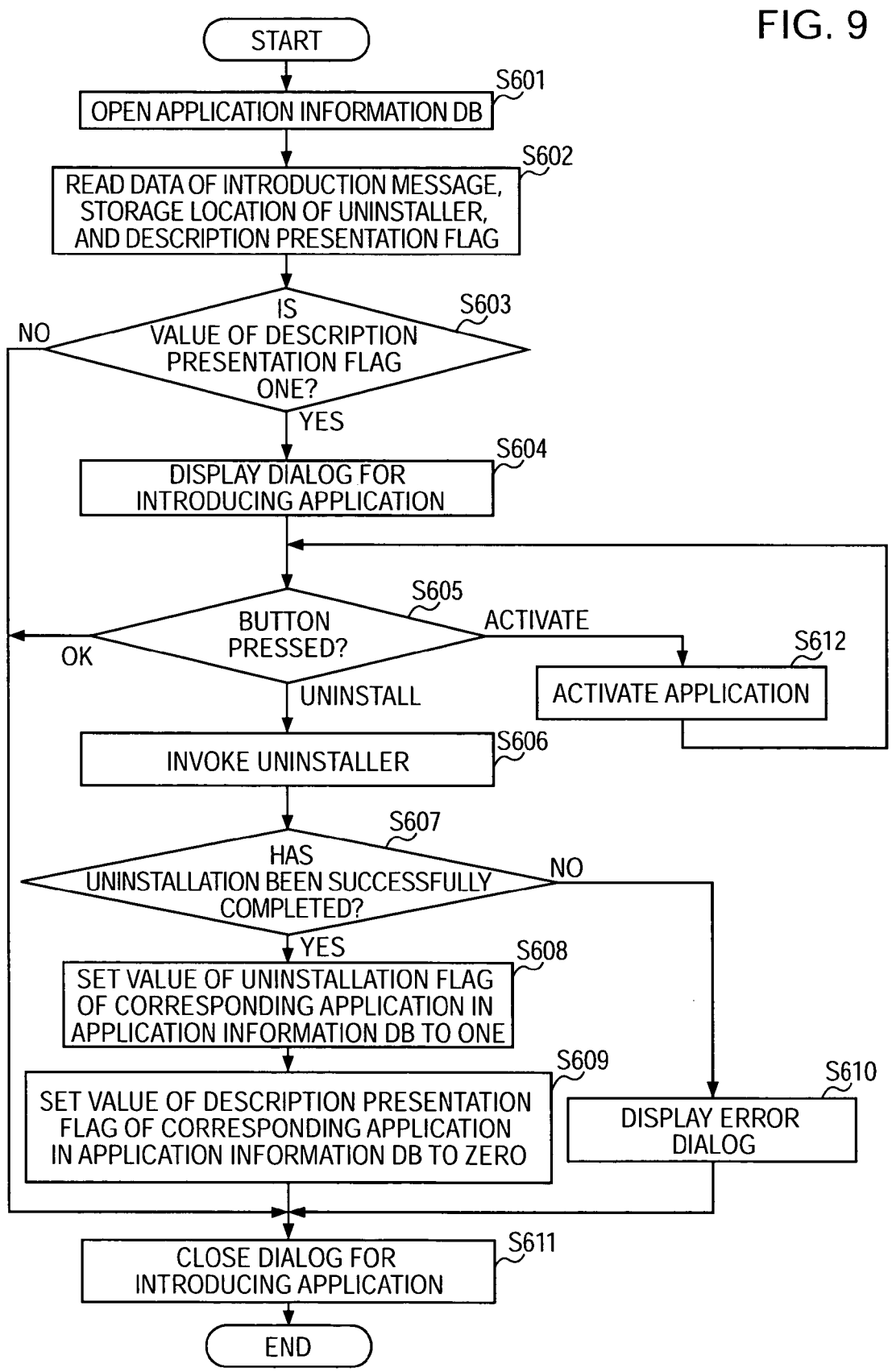
FIG. 9 is a flowchart of a process of an application-introducing program according to the first exemplary embodiment of the present invention.

FIG. 9 is a flowchart of a process of the application-introducing program 111 that is performed when an uninstall button is pressed. The application-introducing program 111 is invoked when the printer driver 107 determines that introduction of corresponding applications is required. In this process, a screen for introducing the application software 101 is first displayed. Then, when the uninstall button is pressed, uninstallation processing is performed, and then the corresponding program is completed.

Figure 17:
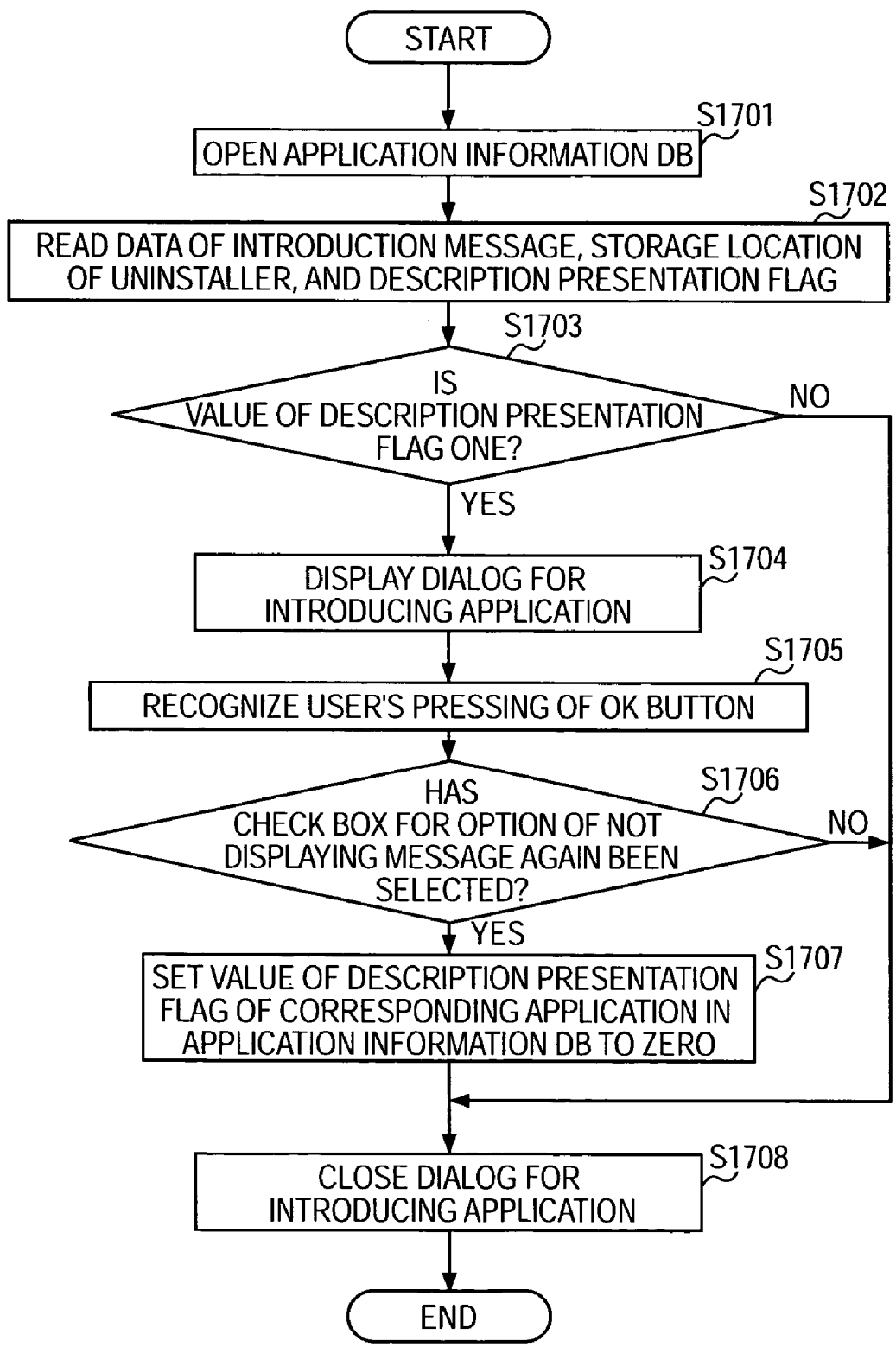
FIG. 17 is a flowchart of an exemplary process of introducing software according to the first exemplary embodiment of the present invention.

FIG. 17 is a flowchart of a process of the application-introducing program 111 that is performed when an OK button is pressed. In this process, a screen for introducing the application software 101 is first displayed. Then, when the user specifies that an introduction message of a corresponding application should not be displayed again, the message will not be displayed thereafter. In a case where the user presses a button for specifying that the message should not be displayed again and an uninstall button or an OK button is pressed, even when the conditions for displaying the message are satisfied, the message shown in FIG. 10 will not be displayed thereafter.

Figures 10, 11:
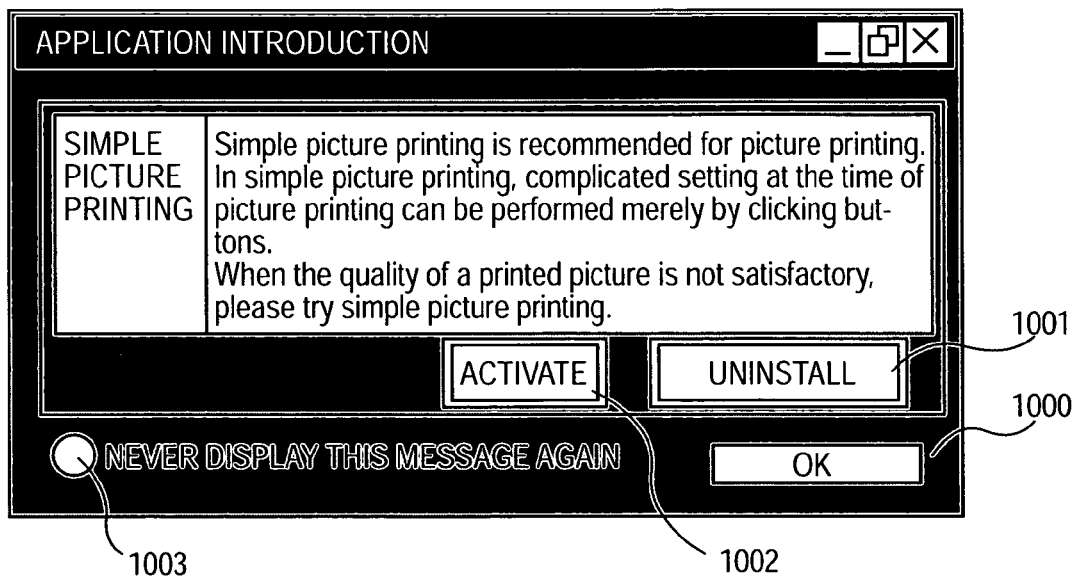
FIG. 10 shows an exemplary application-software introduction screen according to the first exemplary embodiment of the present invention.
FIG. 11 shows the content of an exemplary application information database (DB) according to the first exemplary embodiment of the present invention.

FIG. 10 shows an exemplary application-software introduction screen that is invoked by the application-introducing program 111. This screen includes a message that introduces the corresponding application software 101 to the user, an uninstall button for uninstalling the corresponding application software 101, a check box for the user to specify that introduction of the corresponding application software 101 should not be performed again, and an OK button for closing the application-software introduction screen.

FIG. 11 shows a table of the data of the application software 101 that is stored in the application information DB 109 according to the first exemplary embodiment. The following types of data are stored in the application information DB 109: names of individual applications that are currently installed, data types that are recommended to be used for print processing in the individual applications, description presentation flags that indicate whether introduction messages of the individual applications are to be displayed, storage locations of the corresponding application uninstallers 112 that uninstall the individual applications, uninstallation flags that indicate whether the individual applications have been installed before, and introduction messages for introducing the individual applications. A description presentation flag having a value of one indicates that the corresponding introduction message is to be presented. A description presentation flag having a value of zero indicates that no introduction message is to be presented. An uninstallation flag having a value of zero indicates that the corresponding application has not been uninstalled before. An uninstallation flag having a value of other than zero indicates that the corresponding application has been uninstalled before.

FIG. 12 shows a table of print histories of individual data types. This table shows the frequencies of printing that is performed for individual data types and further the frequencies of printing that is performed for individual applications for each data type. For example, this table shows that printing is performed fifteen times for a simple Web printing application and five times for applications other than a recommended application for data of a Web data type (for example, Hyper Text Markup Language (HTML) or extensible Markup Language (XML) data) and that printing is performed zero times for a simple picture printing application and fifty times for applications other than a recommended application for data of a picture data type.

FIG. 13 shows a print-profile conversion table. This table shows data required for determining data types of print data on the basis of the results of the printer driver 107 extracting profiles of the print data. In this table, the data type of corresponding print data is uniquely determined on the basis of the extension of a corresponding file and the size and type of a corresponding print paper.

The process of the integrated application installer 108 installing the application software 101 (also referred to as an application) according to the first exemplary embodiment will now be described with reference to FIG. 2. This process includes a step of the integrated application installer 108, which installs a plurality of applications, determining an application to be installed and a step of holding data required for registering the application to be installed and registering the data in the application information DB 109 when the application is successfully installed.

In step S201, an installation instruction from the user is accepted. The mode of the installation instruction is a standard installation mode in which applications that are recommended by the integrated application installer 108 are all installed or a custom installation mode in which the user can select applications to be installed. In step S202, the mode of the installation instruction selected by the user is determined.

When it is determined in step S202 that the standard installation mode has been selected, the process proceeds to step S203. When it is determined in step S202 that the custom installation mode has been selected, the process proceeds to step S205.

For a standard installation, in step S203, a list of applications that are recommended to be installed (hereinafter referred to as a recommended-applications installation list) is created, and the process proceeds to step S204. In step S204, applications that should not be installed are selected and deleted from the created recommended-applications installation list on the basis of data in the application information DB 109 to create a list of applications that are to be actually installed (hereinafter referred to as an applications-to-be-installed list). Then, the process proceeds to step S214.

For a custom installation, in step S205, a recommended-applications installation list corresponding to the custom installation mode is created. Then, in step S206, applications that should not be installed are selected and deleted from the created recommended-applications installation list on the basis of data in the application information DB 109 to create an applications-to-be-installed list. Then, in step S207, applications that can be installed are presented to the user, the user is allowed to select application to be installed, and the applications-to-be-installed list is updated. Then, the process proceeds to step S214.

Next, processing performs a loop in which the following steps are repeatedly performed for all applications in the applications-to-be-installed list obtained in step S204 or S207. In step S214, it is determined whether all of the applications in the applications-to-be-installed list have been processed. If it is determined that not all of the application in the applications-to-be-installed list have been processed, processing proceeds to step S208 where application is initially set to the first application in the applications-to-be-installed list. Subsequently, when processing of step S208 is performed, application is set to the next application in the applications-to-be-installed list. Processing then proceeds from step S208 to step S209.

In step S209, the installer of a corresponding application is activated, and the result of the installation is obtained. Then, in step S210, it is determined whether the installation of the application has been successfully completed on the basis of the result of the installation returned from the installer. When it is determined that the installation of the application has failed, the process proceeds to steps of processing of the next application, i.e., processing returns to step S214. When it is determined that the installation of the application has been successfully completed, the process proceeds to step S211.

In step S211, it is determined whether the application information DB 109 exists. When it is determined that the application information DB 109 exists, the process proceeds to step S213 where data of the installed application is registered in the application information DB 109. When it is determined that the application information DB 109 does not exist, the process proceeds to step S212 where the application information DB 109 is created in the computer system. Then, the process proceeds to step S213, and the above-described processing is performed. The data stored in the application information DB 109 is as shown in FIG. 11. Processing proceeds from step S213 to step S214 to determine whether all applications in the applications-to-be-installed list have been processed (installed). When all of the applications in the applications-to-be-installed list have been installed, the process of the integrated application installer 108 is completed. As described above, if it is determined in step S214 that not all of the applications in the applications-to-be-installed list have been installed, processing moves to step S208 and the installation is performed for the next application in the applications-to-be-installed list, and the above-described processing is performed until it is determined in step S214 that all of the applications in the applications-to-be-installed list have been installed.

The process of deleting applications that are not to be installed from the recommended-applications installation list according to the first exemplary embodiment will now be described with reference to the flowchart of FIG. 3. This process is invoked by the integrated application installer 108. In this process, data of applications that are not to be installed is deleted from the recommended-applications installation list created by the integrated application installer 108.

In step S701, the recommended-applications installation list is obtained from the integrated application installer 108. Then, in step S702, it is determined whether the application information DB 109 exists. When it is determined that the application information DB 109 does not exist, it is determined that the printing system according to the present invention is installed in the computer system for the first time. Then, the process of deleting applications that are not to be installed from the recommended-applications installation list is completed.

When it is determined that the application information DB 109 exists, the process proceeds to step S707, and the following steps are repeatedly performed for all applications in the recommended-applications installation list obtained in step S701. In step S707, it is determined whether all applications in the recommended-applications installation list have been processed. If it is determined in step S707 that all of the applications in the recommended-applications installation list have been processed, processing ends. On the other hand, if it is determined in step S707 that not all of the applications in the recommended-applications installation list have been processed, processing proceeds to step S703 and the corresponding application is set. The first time processing of step S703 is performed, the corresponding application is set to the first application in the recommended-applications installation list. During subsequent processing of step S703, the corresponding application is set to the next application in the recommended-applications installation list. After corresponding application is set, processing moves from step S703 to step S704.

In step S704, it is determined whether data of a corresponding application exists in the application information DB 109. When it is determined that the data does not exist in the application information DB 109, processing returns to step S707 for the processing of the next application if there is another application to be processed.

When it is determined that the data exists in the application information DB 109, the process proceeds from step S704 to step S705. In step S705, the uninstallation flag of the corresponding application is checked. When it is determined that the value of the uninstallation flag is zero, the process returns to step S707 for processing of the next application if there is another application to be processed.

When it is determined that the value of the uninstallation flag is other than zero, it is determined that the corresponding application has been uninstalled before. Thus, it is determined that the application is not to be newly installed in this installation, and the process proceeds to step S706. In step S706, the corresponding application is deleted from the recommended-applications installation list. Processing then returns to step S707 to determine whether all of the applications in the recommended-applications installation list have been processed. After the steps described above have been performed for all applications in the recommended-applications installation list, the updated recommended-applications installation list is returned to the integrated application installer 108 as the applications-to-be-installed list, and the process of deleting applications that are not to be installed from the recommended-applications installation list is completed.

The print processing performed by the application software 101 according to the first exemplary embodiment will now be described with reference to FIG. 4. In this process, a file name having an extension and an application name are embedded in a corresponding document name so the printer driver 107 can determine in the subsequent process applications that have performed printing.

In step S301, print setting is performed before print processing. In step S302, the file name having an extension of the document that is currently opened is obtained. In step S303, the corresponding application name is obtained. In step S304, a character string including a combination of the file name having an extension and the application name is stored as a document name. In step S305, print processing is performed using the document name created in step S304.

The process of the printer driver 107 from a step of starting print processing to a step of displaying a screen for introducing an application according to the first exemplary embodiment will now be described with reference to FIG. 5. In this process, the printer driver 107 saves print histories, determines whether a screen for introducing an application is to be displayed on the basis of the print histories, and invokes the application-introducing program 111.

When the printer driver 107 is invoked by the OS 102, the printer driver 107 initializes a print job in step S401. At this time, the print settings such as the size (for example, A4 or letter size) and type (for example, plain paper or glossy paper) of output paper are saved. The print settings are used in step S407. In step S402, an application name and a file name are retrieved from a corresponding document name included in the print job and stored. In step S403, print data is created. In step S404, the print data is transmitted to the printer 18. In step S405, it is determined whether an application name has been successfully retrieved in step S402. When it is determined that an application name has not been successfully retrieved, the application name is set to "NON-RECOMMENDED APPLICATION" in step S406.

In step S407, the print profile is extracted. Then, in step S408, the data type is determined on the basis of the extracted print profile. In step S409, a print history of the corresponding data type is stored in the print history DB 110 on the basis of the obtained file name, application name, and data type. Print histories of individual data types are as shown in FIG. 12. The print history DB 110 is stored in the HD 10 shown in FIG. 18 and can be accessed by various types of programs in read and write modes.

In step S410, the print history DB 110 is accessed. Then, in step S411, it is determined whether printing has been performed for the data type determined in step S408 a predetermined number of times or more. When it is determined that there is no data type for which printing has been performed the predetermined number of times or more, the process of the printer driver 107 is completed. On the other hand, when it is determined that there is some data type for which printing has been performed the predetermined number of times or more, the process proceeds to step S412. In step S412, it is determined whether printing has been performed for the data type by a corresponding recommended application. When it is determined that print processing has been performed for the data type by the corresponding recommended application, the process of the printer driver 107 is completed. Otherwise, the application data is read from the application information DB 109 in step S413. Then, in step S414, the application-introducing program 111 is activated and supplied with the application data. After step S414 is performed, the process of the printer driver 107 is completed. For example, a case where printing has been performed for the picture data type will now be described with reference to FIG. 12. Assume that the process has proceeded to step S412. In this case, it is determined in step S412 that printing has not been performed for the picture data type by the simple picture printing application, which is the application recommended for the picture data type. Thus, the process proceeds to step S413. In step S413, the corresponding introduction message of the simple picture printing application is read from the application information DB 109, and the process proceeds to step S414 where the introduction message is displayed. Another case where printing has been performed for the Web data type will now be described with reference to FIG. 12. In this case, it is determined in step S412 that simple Web printing, which is the corresponding recommended application, has been used fifteen times. Thus, the process is completed. In the process described above, the data type, for example, the picture data type or the Web data type, is determined in step s408 with reference to the print-profile conversion table on the basis of the print profile extracted in step S407.

The process of the printer driver 107 extracting a print profile according to the first exemplary embodiment will now be described with reference to FIG. 6. In this process, an extension is obtained from a corresponding file name, and the size and type of print paper are obtained from the print setting data. The obtained extension, the size and type of print paper, and the like are treated as print profile data.

In step S501, a corresponding file name and the print setting data are received from the printer driver 107. In step S502, an extension is obtained from the corresponding file name. Then, in step S503, it is determined whether an extension has been successfully obtained. When it is determined in step S503 that an extension has not been obtained, the process proceeds to step S504 where a character string "-" that indicates that an extension has not been obtained is set as the extension. Then, the process proceeds to step S505. On the other hand, when it is determined in step S503 that an extension has been obtained, the process directly proceeds to step S505. In step S505, the size and type of output paper are retrieved from the print setting data. Then, in step S506, the size and type of output paper and the extension are returned to the printer driver 107 as print profile data.

The process of the printer driver 107 determining a data type according to the first exemplary embodiment will now be described with reference to FIG. 7. In the first exemplary embodiment, the print-profile conversion table used for determining a data type on the basis of print profile data, i.e., the size and type of output paper and the extension, is provided, and a corresponding data type is determined using the print-profile conversion table. An exemplary print-profile conversion table is shown in FIG. 13.

In step S801, print profile data is received from the printer driver 107. In step S802, the print-profile conversion table is read. Then, processing proceeds to step S808 which starts a loop in which the individual fields of the print profile data, i.e., the size and type of output paper and the extension, are processed in order of the extension, the size of output paper, and the type of output paper. In step S808, it is determined whether all fields of the print profile data have been processed. If all of the fields of the print profile data have been processed, processing proceeds to step S809. Otherwise, processing proceeds to step S803 to set the field to be processed. The first time in step S803, the field is set to the first field of the print profile data. For all times subsequent to the first time, the field is set to the next field of the print profile data in step S803. Processing then proceeds to step S804.

In step S804, it is determined whether more than one line that have a corresponding field value exist in the print-profile conversion table. When it is determined that only one line that has the corresponding field value exists, the line is selected and the process returns to step S808 to determine if all fields have been checked. If all fields have not been checked, the process proceeds to step S803 to check the next field. When it is determined that more than one line have the corresponding field value, the process proceeds from step S804 to step S805. In step S805, any line that matches the corresponding field value of the print profile data is selected. Then, in step S806, it is determined whether any line that matches the corresponding field value exists. When it is determined that no line that matches the corresponding field value exists, the process proceeds to step S807. In step S807, any line that has the corresponding field value of "-" that indicates that "OTHERS" (values of the extension and the size and type of paper that are not defined in the print-profile conversion table) in the print-profile conversion table is selected. Then, the process returns to step S808 to determine if all fields have been checked and then to step S803 to check the next field if not all fields have been checked. When it is determined in step S806 that a line that matches the corresponding field value exists, the line is selected, and the process returns to step S808. The loop is repeated until check of all fields, e.g., "EXTENSION", "PAPERSIZE", and "MEDIATYPE" fields, is completed. After it is determined in step S808 that all fields have been checked, processing moves to step S809.

In step S809, a data type is determined on the basis of the result of processing of all of the fields and the determined data type is returned to the printer driver 107. Then, the process of determining a data type is completed. For example, a case where print profile data that includes the extension field value of "jpg", the paper size field value of "POSTCARD", and the paper type field value of "POSTCARD" is checked against the print-profile conversion table shown in FIG. 13 will now be described. Since the extension field value is "jpg", first lines that have the extension field value of "jpg" are selected from the print-profile conversion table. Then, since the paper size field value is "POSTCARD", lines that have PAPERSIZE field value of "POSTCARD" are selected from the first lines. When the paper type field value is "POSTCARD", there is no corresponding field value defined in the print-profile conversion table. Thus, a third line that has MEDIATYPE field value of "-" is selected from the second lines. Since the third line has the data type field value of "POSTCARD", a data type of "POSTCARD" is obtained. In another case where print profile data includes the extension field value of "jpg", the paper size field value of "A4", and the paper type field value of "GLOSSY PAPER", a data type of "PICTURE" is obtained.

The process of storing print histories of individual data types according the first exemplary embodiment will now be described with reference to FIG. 8.

The process of storing print histories of individual data types is invoked by the printer driver 107. In this process, print histories are stored for individual data types.

In step S901, the data type of print data and the name of an application that has performed printing (hereinafter referred to as a printing application) are obtained from the printer driver 107. In step S902, the application information DB 109 is accessed. In step S903, it is determined whether the name of the printing application exists in the application information DB 109. When it is determined in step S903 that the name of the printing application does not exist in the application information DB 109, the process proceeds to step S904 where the name of the printing application is set to "NON-RECOMMENDED APPLICATION". Then, the process proceeds to step S905. When it is determined in step S903 that the name of the printing application exists in the application information DB 109, the process directly proceeds to step S905.

In step S905, the print history DB 110 is accessed. In step S906, one is added to the total number of printing operations performed for the corresponding data type. In step S907, one is added to the number of printing operations performed for the combination of the corresponding data type and the corresponding printing application. Then, the process of storing print histories of individual data types is completed.

The process from a step of displaying a dialog for introducing an application to a step of uninstalling the application upon receiving an uninstallation instruction from the user according to the first exemplary embodiment will now be described with reference to FIG. 9. An exemplary dialog for introducing an application is as shown in FIG. 10.

In step S601, the application information DB 109 is opened. In step S602, the following types of data are read: the introduction message of an application, the storage location of the corresponding application uninstaller 112, and the corresponding description presentation flag, which indicates whether the description of the application is to be displayed. Then, in step S603, the value of the description presentation flag is checked. When it is determined in step S603 that the value of the description presentation flag is zero, the process of displaying the dialog for introducing the application is completed because the description will not be displayed. When it is determined in step S603 that the value of the description presentation flag is not one, processing proceeds to step S611.

When it is determined in step S603 that the value of the description presentation flag is one, the process proceeds to step S604 where the dialog for introducing the corresponding application is displayed. Then, in step S605, it is determined whether the user has pressed any button.

When it is determined in step S605 that the user has pressed an OK button 1000, the process proceeds to step S611 where the dialog for introducing the application is closed. When it is determined in step S605 that the user has pressed an uninstall button 1001, the process proceeds to step S606. When it is determined in step S605 that the user has pressed an activate button 1002, the process proceeds to step S612 where the recommended application is activated. The user can obtain print output of a satisfactory quality by performing printing using the activated application. For example, when the user is going to print ten pictures in total, the user may first print the first picture from a certain application. Then, an application suitable for data to be printed is introduced to the user after the first picture is printed. Then, when the user accepts the recommendation, the recommended application is activated. Then, the remaining nine pictures can be printed using the recommended application. After the application is activated in step S612, processing returns to step S605 to wait for the user to press another button.

In step S606, the corresponding application uninstaller 112 is loaded from the storage location of the application uninstaller 112 and executed, and the result of the uninstallation is received.

In step S607, it is determined whether the uninstallation has been successfully completed. When it is determined that the uninstallation has been successfully completed, the process proceeds to step S608 where the value of the uninstallation flag of the corresponding application in the application information DB 109 is set to one. Then, in step S609, the value of the corresponding description presentation flag is set to zero. Then, the process proceeds to step S611. When it is determined in step S607 that the uninstallation has failed, the process proceeds to step S610 where an error dialog is displayed. Then, the process proceeds to step S611. In step S611, the dialog for introducing the application is closed, and the process is completed.

The process from a step of displaying the dialog for introducing an application to a step of closing the dialog after the user presses the OK button 1000 according to the first exemplary embodiment will now be described with reference to FIG. 17.

In step S1701, the application information DB 109 is opened. In step S1702, the following types of data are read: the introduction message of an application, the storage location of the corresponding application uninstaller 112, and the corresponding description presentation flag, which indicates whether the description of the application is to be displayed. Then, in step S1703, the value of the description presentation flag is checked. When it is determined in step S1703 that the value of the description presentation flag is zero, the process of displaying the dialog for introducing the application is completed because the description will not be displayed. When it is determined in step S1703 that the value of the description presentation flag is not one, processing proceeds to step S1708.

When it is determined in step S1703 that the value of the description presentation flag is one, the process proceeds to step S1704 where the dialog for introducing the corresponding application is displayed. Then, in step S1705, the user's pressing of the OK button 1000 is recognized. Then, in step S1706, it is determined whether a check box for an option of not displaying the corresponding message again 1003 is selected on the dialog screen. When it is determined in step S1706 that the check box is selected, the process proceeds to step S1707 where the value of the corresponding description presentation flag is set to zero. Then, the process proceeds to step S1708. When it is determined in step S1706 that the check box has not been selected, the process directly proceeds to step S1708.

Then, in step S1708, the dialog for introducing the application is closed, and the process is completed.

In this exemplary embodiment, three types of data are used as print profile data: the extension of a file and the size and type of print paper. Alternatively, other types of print setting data may be used as print profile data, for example, the print quality, or types of image processing performed on a corresponding image.

Moreover, in this exemplary embodiment, the integrated application installer 108, which controls a plurality of installers, registers application data in the application information DB 109. Alternatively, a resident program that controls applications and the installers of the individual applications may be provided and register application data in the application information DB 109.

Moreover, in this exemplary embodiment, an application is introduced after the printer driver 107 sends a print instruction to the printer 18. Alternatively, an application may be introduced during a period between the time when the application issues a print instruction and the time when the print instruction is sent to the printer 18.

Second Exemplary Embodiment

A second exemplary embodiment will now be described. In the second exemplary embodiment, a plurality of recommended printing applications exist for one data type.

Moreover, in the second exemplary embodiment, application data stored in the application information DB 109 includes data types of print data for which individual applications suitably perform printing and the priorities of the individual applications performing printing for the corresponding types of print data, and a printer driver uses the priorities of the individual applications to determine applications that are actually to be introduced. The second exemplary embodiment is the same as the first exemplary embodiment in terms of the configuration of other modules, the operations of the application installer, the application software, and the dialog for introducing an application, and the contents of the table of print histories of individual data types and the print-profile conversion table. Therefore, such descriptions will not be repeated here.

The flow of print processing according to the second exemplary embodiment will now be described with reference to FIGS. 14 to 16.

Figure 14:
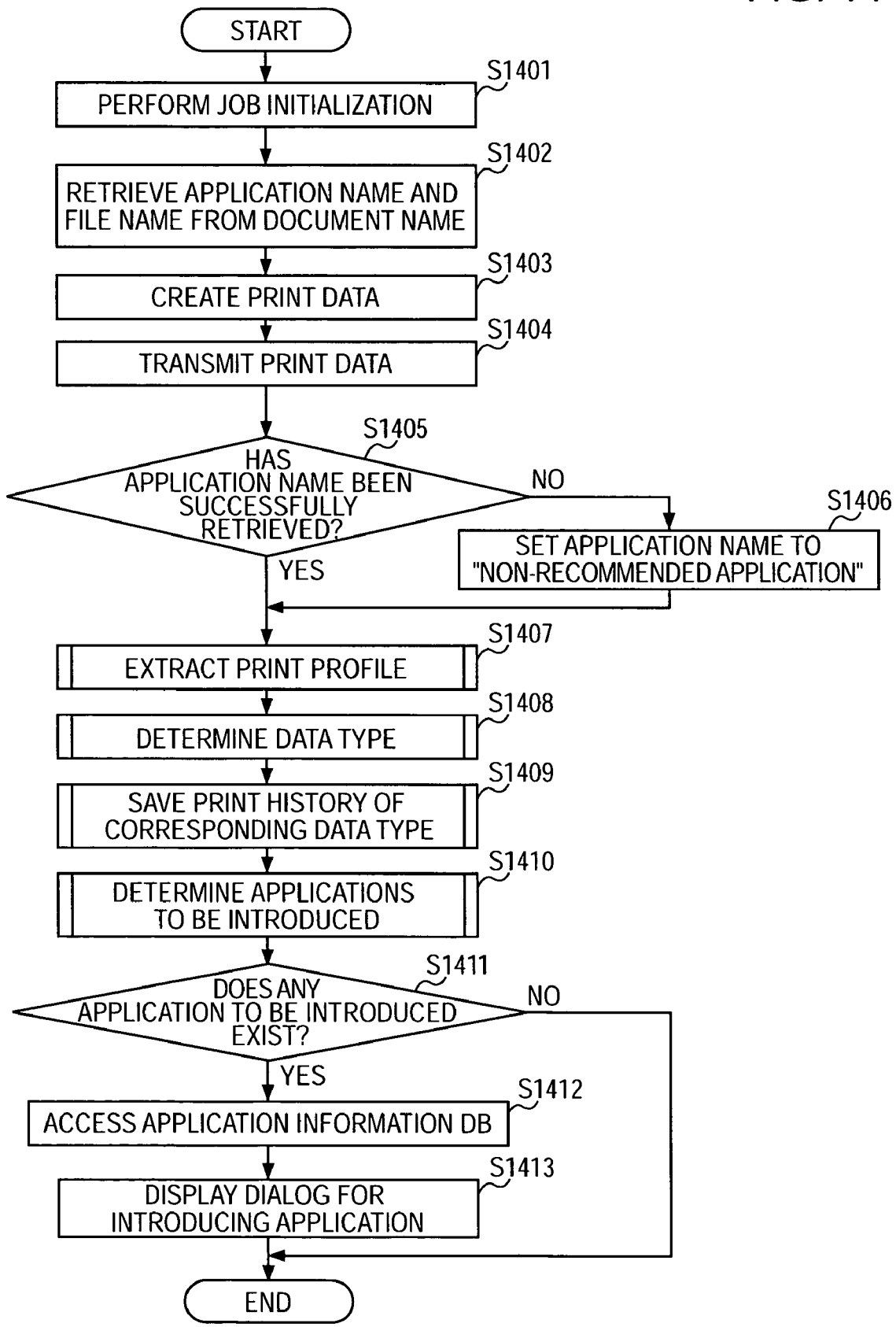
FIG. 14 is a flowchart of print processing of a printer driver according to a second exemplary embodiment of the present invention.

FIG. 14 is a flowchart of print processing of a printer driver according to the second exemplary embodiment. In this processing, print processing is first performed. Then, a corresponding print history is recorded, and a process of determining whether corresponding applications are to be introduced is invoked. When it is determined that the corresponding applications are to be introduced, the application-introducing program 111 is invoked.

Figure 15:
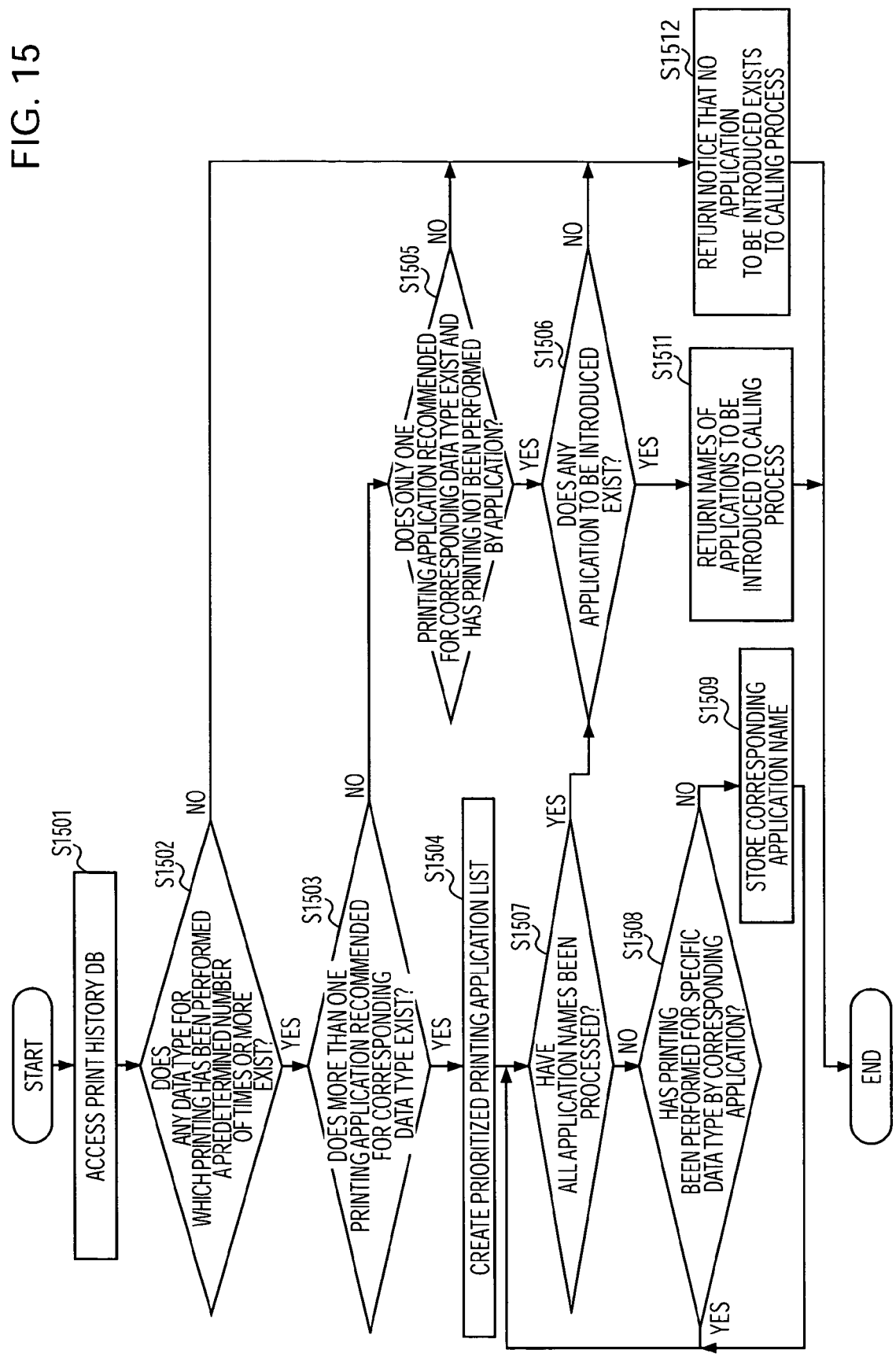
FIG. 15 is a flowchart of an exemplary process of determining applications to be introduced according to the second exemplary embodiment of the present invention.

FIG. 15 is a flowchart of the process of determining applications to be introduced. This process is invoked by the printer driver 107, and determines applications to be installed on the basis of data in the application information DB 109 and the print history DB 110.

FIG. 16 shows data stored in the application information DB 109 according to the second exemplary embodiment.

In the second exemplary embodiment, the priority of each application for a corresponding recommended data type is set. The priority level 5 indicates the highest priority, and the priority level 0 indicates the lowest priority. The priorities of individual applications can be set in advance and changed by the user as necessary.

The process of the printer driver 107 from a step of starting print processing to a step of displaying a screen for introducing applications according to the second exemplary embodiment will now be described with reference to FIG. 14.

When the printer driver 107 is invoked by the OS 102, the printer driver 107 initializes a print job in step S1401. At this time, the print settings such as the size (for example, A4 or letter size) and type (for example, plain paper or glossy paper) of output paper are saved. The print settings are used in step S1407. In step S1402, an application name and a file name are retrieved from a corresponding document name included in the print job and stored. In step S1403, print data is created. In step S1404, the print data is transmitted to the printer 18. In step S1405, it is determined whether an application name has been successfully retrieved in step S1402. When it is determined that an application name has not been successfully retrieved, the application name is set to "NON-RECOMMENDED APPLICATION" in step S1406.

In step S1407, the print profile is extracted. Then, in step S1408, the data type is determined on the basis of the extracted print profile. In step S1409, a print history of the corresponding data type is stored in the print history DB 110 on the basis of the obtained file name, application name, and data type. Print histories of individual data types are as shown in FIG. 12.

In step S1410, the process of determining applications to be introduced is invoked, and the result is received from the process. In step S1411, on the basis of the result obtained in step S1410, it is determined whether any application to be introduced exists. When it is determined that no application to be introduced exists, the process of the printer driver 107 is completed. On the other hand, when it is determined that at least one application to be introduced exists, the process proceeds to step S1412 where corresponding application data is read from the application information DB 109. Then, in step S1413, the application-introducing program 111 is activated and supplied with the application data. Then, the process of the printer driver 107 is completed.

The process of determining applications to be introduced, which is invoked by the printer driver 107, according to the second exemplary embodiment will now be described with reference to FIG. 15. In the second exemplary embodiment, when more than one printing application exists for a data type, it is determined whether introduction is to be performed in order of priority, and an application that should be most introduced (i.e., application having the highest priority) in a corresponding situation is introduced. The application information DB 109 is as shown in FIG. 16.

In step S1501, the print history DB 110 is accessed. Then, in step S1502, it is determined whether any data type for which printing has been performed a predetermined number of times or more exists. When it is determined that no corresponding data type exists, the process proceeds to step S1512. In step S1512, a notice that no application to be introduced exists is returned to the calling process, and the process is completed. On the other hand, when it is determined in step S1502 that a corresponding data type exists, the process proceeds to step S1503.

In step S1503, it is determined whether more than one printing application recommended for printing data of the corresponding data type exists. When it is determined that more than one printing application recommended for printing data of the corresponding data type exists, the process proceeds to step S1504. In step S1504, a list (hereinafter referred to as a prioritized printing application list) of printing applications recommended for printing data of the corresponding data type is created. The printing applications are arranged in order of priority in the prioritized printing application list. Then, the proceeds to step S1507.

In step S1507, it is determined whether all application names have been processed. When it is determined that the corresponding steps have been performed for all of the printing applications, the process proceeds to step S1506. Otherwise, processing proceeds to step S1508.

In step S1508, it is determined whether a printing application that is currently checked has performed printing for a specific data type with reference to the print history DB 110 updated in step S1409 in FIG. 14. When it is determined that the printing application has performed printing for the specific data type, processing returns to step S1507 and the next printing application is checked. When it is determined that the printing application has not performed printing for the specific data type, the process proceeds to step S1509 where the name of the application is stored as that of an application to be introduced and processing returns to step S1507 and the next printing application is checked. The foregoing steps are to be performed for all of the printing applications. In this illustration, it is determined in step S1508 whether a printing application has performed printing for a specific data type zero times or one or more times. Alternatively, it may be determined in step S1508 whether an application has performed printing for a specific data type N times or more, where N is an integer greater than zero. In this case, when it is determined that the application has performed printing for the specific data type N times or more, the process goes back to step S1507. Otherwise, the process proceeds to step S1509. Then, the process goes back to step S1507.

In step S1506, it is determined whether any application to be introduced is stored in step S1509. When it is determined in step S1506 that no application to be introduced is stored, the process proceeds to step S1512 where a notice that no application to be introduced exists is returned to the calling process. Otherwise, the process proceeds to step S1511.

In step S1511, the names of the applications to be introduced that have been stored in step S1509 is returned to the calling process.

When it is determined that more than one printing application recommended for printing data of the corresponding data type do not exist in step S1503, the process proceeds to step S1505. In step S1505, it is determined whether only one printing application recommended for the corresponding data type exists and whether the printing application has not performed printing. When it is determined that the printing application has not performed printing, the process proceeds to step S1512. When it is determined that no printing application recommended for the corresponding data type exists, the process proceeds to step S1512. Otherwise, the process proceeds to step S1506. In step S1512, a notice that no application to be introduced exists is returned to the calling process. Then, the process is completed.

In the exemplary embodiments, only messages for introducing applications were described. Alternatively, images and moving images may be stored and used for introducing recommended software. Moreover, in the exemplary embodiments, the printer driver 107 holds histories of software being deleted and uses these histories at the time of printing. Alternatively, an independent application other than the printer driver 107 may hold the histories of software being deleted as a deletion history DB and cooperate with other applications. For example, the deletion history DB may be installed in a computer, histories of applications that have been installed and deleted may be saved in the deletion history DB. In this case, the integrated application installer 108, which installs a plurality of types of software, may not install applications that have been deleted before with reference to the deletion history DB. Moreover, when a plurality of applications have a similar function, the integrated application installer 108 may use data in the deletion history DB to determine an application to be installed.

In the exemplary embodiments, when a plurality of printing applications exist, only one application to be introduced is automatically determined, and only the introduction message of the application is displayed. Alternatively, the introduction messages of more than one application may be displayed at the same time. For example, when it is determined that the introduction messages of some applications should be presented to the user in a case where data of a certain data type is printed, a list of applications as shown in FIG. 11 may be presented to the user, and the user may be allowed to select an application from the list. In this case, only applications that have been used zero times or less than N times may be included in the list to be presented to the user.

Moreover, in this case, a function of uninstalling applications that are determined as not to be used by the user from the plurality of presented applications may be provided.

Moreover, in this case, a function of specifying applications that have been well understood by the user and will not be again displayed in the introduction list out of the plurality of presented applications may be provided.

The print history data includes types of data that have been printed (for example, an extension of a printing application), output paper sizes (for example, A4 or compact disk-recordable (CD-R)), types of output recording media (for example, glossy paper or a printable CD-R), and usages of print data (for example, Web, picture, or postcard).

When data that indicates the type of data to be printed, for example, "jpg" being an extension of a printing application, indicates a specific data type, for example, picture printing, the simple picture printing application that is an exemplary application suitable for the corresponding picture printing can be determined.

Moreover, it can be determined whether the simple picture printing application has been used on the basis of print histories that have been obtained. When it is determined that the simple picture printing application has not been used, a message that an application suitable for printing images is not used and a screen that recommends the use of an appropriate application may be displayed on the monitor 104.

When the type of an output medium is a CD-R that is an exemplary disk recording medium, a simple CD printing application that is exemplary software suitable for a disk recording medium may be presented to the user as a recommended application. When the type of the output medium is glossy paper or a postcard, software suitable for printing pictures may be presented to the user as a recommended application. For example, see FIG. 13.

The data type may be the picture data type, the Web data type, the postcard data type, or the CD-R data type.

In the exemplary embodiments, when the user performs a certain type of printing in a stage in which the user becomes accustomed to printing operations, an application that is most suitable for the type of printing is introduced to the user. Thus, the user can sufficiently recognize the value of the application and can be encouraged to use a convenient printing method.

Moreover, in the exemplary embodiments, the user can determine whether the user deletes an application in a state in which the user's ability to make a decision on the application as described above. Thus, unnecessary applications can be deleted and the storage capacity of a computer system can be saved without necessary applications being deleted.

Other Exemplary Embodiments

The individual processes shown in the drawings according to the exemplary embodiments can be performed by the individual units according to programs that are installed from the outside. The present invention is applicable to a case where data including these programs is supplied to a host computer with a storage medium, such as a compact disk-read only memory (CD-ROM), a flash memory, or an FD, or from an external storage medium via a network.

The exemplary embodiments are also implemented by providing to a system or an apparatus a storage medium that stores program code (software) that performs the functions according to the foregoing exemplary embodiments or downloading the program code from an external server (not shown) to the system or the apparatus and by causing a computer (a CPU or a micro-processing unit (MPU)) included in the system or in the apparatus to read and execute the program code.

In this case, the program code read from the storage medium can perform the functions according to the foregoing exemplary embodiments. A typical storage medium for supplying the program code is a floppy disk, a hard disk, an optical disk, a magneto-optical (MO) disk, a digital versatile disk (DVD), a CD-ROM, a magnetic tape, a nonvolatile memory card, a ROM, or an electrically erasable programmable read-only memory (EEPROM).

Moreover, an OS operating on a computer may execute some or all of the actual processing to perform the functions of the foregoing exemplary embodiments according to instructions from the program code. Moreover, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the foregoing exemplary embodiments according to instructions from the program code.

As described above, according to the exemplary embodiments, appropriate print processing software or image processing software can be effectively utilized using print histories.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-186588 filed Jun. 27, 2005, which is hereby incorporated by reference herein in its entirety.

What is claimed is:

1. A data processing apparatus comprising:
a storage unit configured to store print history data;
a judging unit configured to judge, based on the print history data stored in the storage unit, whether printing has been performed for a data type at least a predetermined number of times;
a determination unit configured to determine, when the judging unit judges that the printing has been performed for the data type at least the predetermined number of times, whether the printing has been performed for the data type by a corresponding recommended software; and a display unit configured to display a screen for introducing the corresponding recommended software when the determination unit determines that printing has not been performed for the data type by the corresponding recommended software.

2. The data processing apparatus according to claim 1, further comprising an instructing unit configured to issue an instruction for deleting the corresponding recommended software.

3. The data processing apparatus according to claim 1, wherein the display unit is configured to display the screen for introducing the corresponding recommended software based on an extension of a file and the print history data.

4. The data processing apparatus according to claim 1, wherein the display unit is configured to display the screen for introducing the corresponding recommended software based on paper size and the print history data.

5. The data processing apparatus according to claim 1, wherein the display unit is configured to display a name of software that has not been uninstalled on the screen for introducing the corresponding recommended software.

6. A data processing method comprising:
reading print history data stored in a storage unit;
judging, based on the print history data stored in the storage unit, whether printing has been performed for a data type at least a predetermined number of times;
determining, when it is judged that printing has been performed for the data type at least the predetermined number of times, whether printing has been performed for the data type by a corresponding recommended software; and
displaying a screen for introducing the corresponding recommended software when it is determined that printing has not been performed for the data type by the corresponding recommended software.

7. The data processing method according to claim 6, wherein the screen for introducing the corresponding recommended software includes an instruction for deleting recommended software.

8. The data processing method according to claim 6, wherein the screen for introducing the corresponding recommended software is displayed based on an extension of a file and the print history data.

9. The data processing method according to claim 6, wherein the screen for introducing the corresponding recommended software is displayed based on paper size and the print history data.

10. The data processing method according to claim 6, wherein the screen for introducing the corresponding recommended software displays a name of software that has not been uninstalled.

11. A computer-readable medium including computer-readable instructions for performing a method comprising:
reading print history data stored in a storage unit;
judging, based on the print history data stored in the storage unit, whether printing has been performed for a data type at least a predetermined number of times;
determining, when it is judged that printing has been performed for the data type at least the predetermined number of times, whether printing has been performed for the data type by a corresponding recommended software; and
displaying a screen for introducing the corresponding recommended software when it is determined that printing has not been performed for the data type by the corresponding recommended software.

12. The computer-readable medium according to claim 11, wherein the screen for introducing the corresponding recommended software includes an instruction for deleting recommended software.

13. The computer-readable medium according to claim 11, wherein the screen for introducing the corresponding recommended software is displayed based on an extension of a file and the print history data.

14. The computer-readable medium according to claim 11, wherein the screen for introducing the corresponding recommended software is displayed based on paper size and the print history data.

15. The computer-readable medium according to claim 11, wherein the screen for introducing the corresponding recommended software displays a name of software that has not been uninstalled.

* * * * *